United States Patent
Cholleti et al.

(10) Patent No.: US 7,206,906 B1
(45) Date of Patent: Apr. 17, 2007

(54) PHYSICAL ADDRESS MAPPING FRAMEWORK

(75) Inventors: Udayakumar Cholleti, Cupertino, CA (US); Michael T. Clayton, San Francisco, CA (US); Anthony G. Sumpter, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 371 days.

(21) Appl. No.: 10/798,174

(22) Filed: Mar. 10, 2004

(51) Int. Cl.
*G06F 12/02* (2006.01)
*G06F 13/28* (2006.01)

(52) U.S. Cl. .......................... 711/152; 711/163; 710/22

(58) Field of Classification Search ................ 711/152, 711/163, 165
See application file for complete search history.

(56) References Cited

U.S. PATENT DOCUMENTS

| | | | | |
|---|---|---|---|---|
| 4,777,589 A | * | 10/1988 | Boettner et al. ............... | 710/3 |
| 6,931,471 B2 | * | 8/2005 | Arndt et al. ................. | 710/240 |
| 6,986,006 B2 | * | 1/2006 | Willman et al. ............. | 711/152 |
| 2002/0091841 A1 | * | 7/2002 | Beukema et al. ............ | 709/229 |
| 2004/0064601 A1 | * | 4/2004 | Swanberg ..................... | 710/22 |
| 2004/0064673 A1 | * | 4/2004 | Rogers et al. ............... | 711/207 |
| 2005/0108496 A1 | * | 5/2005 | Elnozahy et al. ........... | 711/203 |

* cited by examiner

*Primary Examiner*—Matthew Kim
*Assistant Examiner*—Shane M Thomas
(74) *Attorney, Agent, or Firm*—Martine Penilla & Gencarella, LLP (57) ABSTRACT

Provided is a method and apparatus for registering requests to access physical memory in a physical address mapping framework. Specifically, a device can register in the physical address mapping framework before accessing physical memory, thus permitting an operating system to identify the device when it is necessary to relocate pages in physical memory. The physical address mapping framework can be any structure that permits registration. For example, the structure can be a list or a tree. When relocating physical memory, all accesses registered in the physical address mapping framework are restricted. Then, the device is notified to stop accessing physical memory via information stored in the physical address mapping framework. After the relocation, the device is notified to resume accessing physical memory via information stored in the physical address mapping framework.

10 Claims, 7 Drawing Sheets

PHYSICAL ADDRESS MAPPING FRAMEWORK

CROSS REFERENCE TO RELATED APPLICATIONS

This application is related to U.S. patent application Ser. No. 10,798,742, filed on Mar. 10, 2004 and entitled "System Memory Relocation During System Uptime," which is hereby incorporated by reference in its entirety.

BACKGROUND

A computing system includes multiple components such as a processor, a memory, and an input/output (I/O) device. Typically, an operating system (OS) manages access to the various components to prevent problems. For example, the memory can experience the problem of having two requests arrive at the same time. Accordingly, the OS schedules multiple requests for the same component to prevent such a problem.

Similar to applications requesting access to components, the components may request access to other components, such as the processor requesting access to the memory. The OS also schedules these requests. However, some components, such as the I/O device, can directly access a component such as the memory, without making a request to the OS. For example, an I/O device can use a direct memory access (DMA) channel to transmit requests to the memory. By not using the processor as an intermediary, operations between the memory and the I/O device can happen faster than if the OS mediated access.

However, there are instances when data in one location in the memory should be relocated to another location. For example, the memory may become fragmented and access to and from the memory slows to unacceptable performance levels. A typical solution is to move the data from a source location to a destination location in the memory. Moreover, some locations in memory may become unreliable and the data in those locations must be moved to prevent data loss. In such instances, the OS moves data in the unreliable memory locations to reliable memory locations.

Unfortunately, some data cannot be moved without placing the OS in a coma-like state. In the coma-like state, the OS ceases operation and overall computing system performance decreases because the OS is not scheduling requests. Further, during the coma-like state, the OS prevents access to the memory by applications and components, such as the processor. However, the OS cannot prevent access to the memory by the I/O device because some components, such as the I/O device, can bypass the OS when accessing the memory. Accordingly, because the OS cannot prevent access to the memory by the I/O device during the data relocation, erroneous information can be disseminated in the computing system.

A simple solution to this problem is to have each and every component including the I/O device transmit all memory requests to the OS. However, this will tremendously decrease the overall performance of the system because access to and from memory via the DMA channel is faster than OS based memory requests.

Accordingly, what is needed is a method and an apparatus for mapping accesses to the memory that bypass transmitting requests to the OS for memory access while maintaining current computing system performance.

SUMMARY

Broadly speaking, the present invention is a method and an apparatus for registering memory accesses by devices without degrading overall system performance. It should be appreciated that the present invention can be implemented in numerous ways, such as a process, an apparatus, a system, a device or a method on a computer readable medium. Several inventive embodiments of the present invention are described below.

One embodiment of a system includes a first page and a second page in a memory, such that the first page contains data capable of being copied to the second page. The system can also include a table in the memory identifying the first page and the second page, such that the table is capable of being enabled and disabled for access to the first page and the second page. Further, the system can include a structure coupled to the table, such that the structure is capable of identifying data in the first page and the second page, wherein a device coupled to the memory is capable of registering information in the structure before accessing the first page.

Another embodiment of a structure in memory includes a table identifying a first page and a second page and a mapping framework coupled to the table identifying the first page and the second page. The structure also includes a record in the mapping framework capable of storing information identifying a device before storing data in the first page and the second page.

An embodiment of a method includes operations for disabling access to a page in a memory and copying the page in the memory, such that the page is identified by a structure coupled to a table in the memory and the structure is capable of storing information identifying a device. The method also includes an operation for enabling access to the page in the memory.

Other aspects of the invention will become apparent from the following detailed description, taken in conjunction with the accompanying drawings, illustrating by way of example the principles of the invention.

BRIEF DESCRIPTION OF THE DRAWINGS

Embodiments of the invention may best be understood by reference to the following description taken in conjunction with the accompanying drawings in which.

DETAILED DESCRIPTION

The following embodiments describe a method and an apparatus for registering memory accesses by devices in a physical address mapping framework without degrading overall system performance. However, any component that bypasses an operating system (OS) when requesting memory access can use the physical address mapping framework, as long as overall system performance does not degrade when registering memory accesses. It will be obvious, however, to one skilled in the art, that the present invention may be practiced without some or all of these specific details. In other instances, well known process operations have not been described in detail in order not to unnecessarily obscure the present invention.

Figure 1:
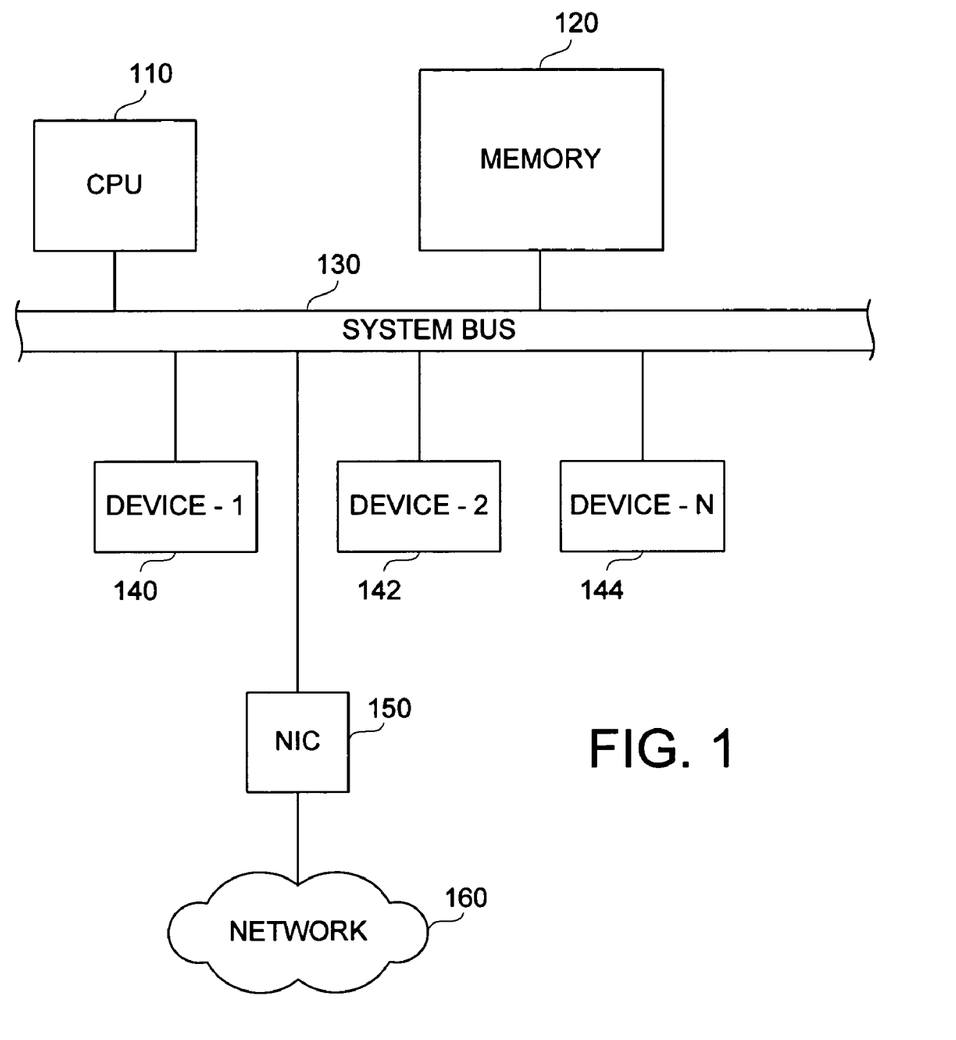
FIG. 1 is a diagram illustrating a system, in accordance with an embodiment of the invention.

FIG. 1 is a diagram illustrating a system, in accordance with an embodiment of the invention. A central processing unit (CPU) 110, a memory 120, multiple devices, and a network interface card (NIC) 150 can connect via a system bus 130. The system bus 130 permits communication throughout the system, such as a request to access the memory 120 from multiple devices, which can include a device-1 140, a device-2 142, and a device-N 144. Various types of devices are possible, such as optical drives, magnetic drives, and flash memory drives. However, any type of device that can connect to the system bus 130 is possible, as long as the device is capable of requesting access to the memory 120. Similarly, a request to access the memory 120 can arrive from a network 160 via the NIC 150 or the CPU 110.

In one exemplary embodiment, the system can have one CPU 110. Further, each CPU 110 can include one or more cores (not shown) that are capable of performing calculations. Accordingly, the CPUs 110 with multiple cores can be called "multi-core" processors. In other exemplary embodiments, the system can have more than one CPU 110. However, any number of CPUs 110 is possible as long as the CPUs 110 can communicate via the system bus 130.

The OS can schedule requests for the memory 120 and can manage access to particular memory locations. For example, the OS can receive multiple requests to access the memory 120 from the CPU 110 or applications operating on the system. After scheduling these requests, the OS can manage access to particular memory locations via virtual memory (VM). Virtual memory defines pages having a virtual address that can represent particular memory locations in the memory 120. Further, the virtual address is a logical representation of a physical address in the memory 120. Thus, when the OS manages accesses to the memory 120, the OS uses VM to map a page with data to a particular memory location having a physical address.

Figure 2:
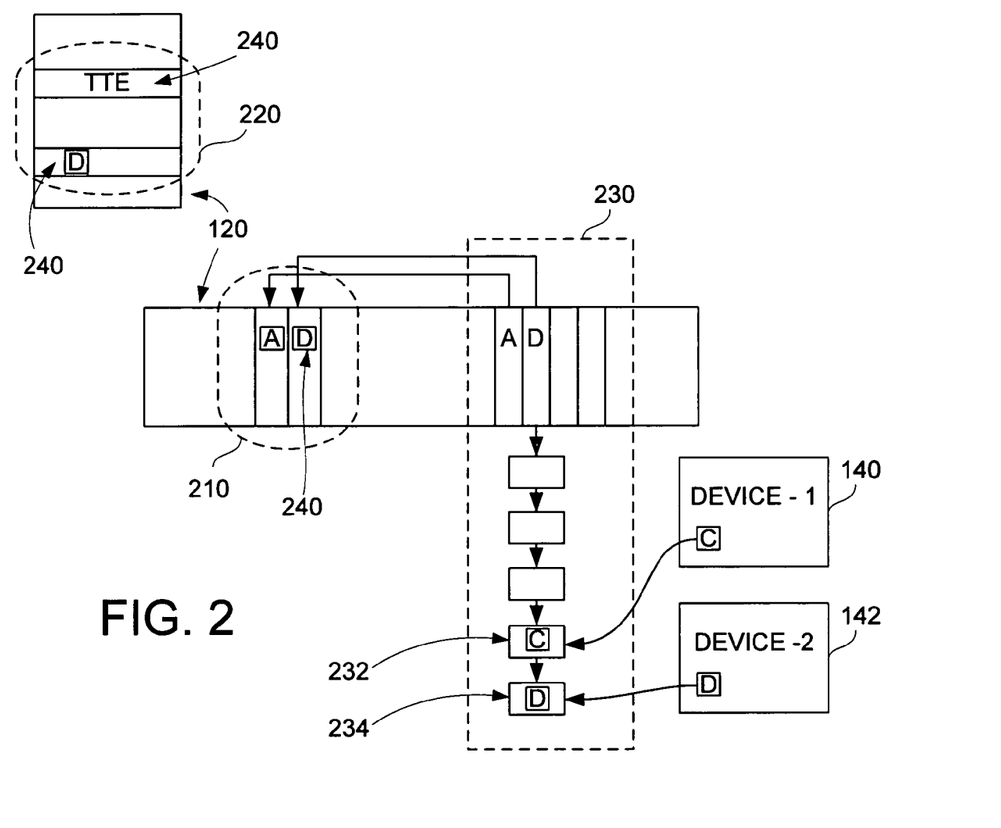
FIG. 2 is a diagram illustrating a physical address mapping framework, in accordance with an embodiment of the invention.

Accordingly, FIG. 2 is a diagram illustrating a physical address mapping framework, in accordance with an embodiment of the invention. For example, the memory 120 can have a physical address space 210, a translation table 220, and a page control table 230. The physical address space 210 consists of multiple memory locations such that each location has a physical address. Correspondingly, a page in VM can map to a physical address.

The translation table 220 can include one or more translation table entries (TTEs) 240. Each TTE 240 can represent a page with data. Further, each TTE 240 is capable of resolving the virtual address for the page with the physical address of the page in the physical address space 210. Accordingly, a data-D 240 in one TTE 240 can be stored in the physical address space 210.

Moreover, the page control table 230 can describe a page in the physical address space 210. The descriptions in the page control table 230 and the virtual address to physical address mappings can also comprise the translation table 220. For example, the data-D 240 in the physical address space 210 can be identified and referenced by the page control table 230. For each access by the OS or an application, the access to the physical address space 210 is registered in the page control table 230. Further, for each access by the device-1 140 and the device 142 to the memory 120, the access to the memory 120 is first recorded in the page control table 230. For example, the device-1 140 can record data in the page control table 230 at a position 232 before using direct memory access (DMA). Thereafter, the device-2 142 can also record the data-D 240 in at a position 234 before using direct memory access (DMA).

The exemplary physical address mapping framework can require all devices to first register a request for the memory 120 before accessing the physical address space 210 via DMA. Accordingly, the page control table 230 is a single location that can describe each page the physical address space 210 and can also identify a source of the data residing in any page in the physical address space. Thus, in an exemplary embodiment where data in one page in the physical address space 210 is moved to another page in the physical address space 210, the page control table 230 can identify all possible accesses to the pages. Consequently, if the OS restricts access to the pages by first taking control of the page control table 230 to prevent access to the pages during the data move, then the dissemination of erroneous information in the system can be eliminated. Specifically, information stored in the page control table 230 can identify the source of the information. Thus, the OS can use the information to notify the source, such as a device, to stop accessing the pages.

Figure 3A:
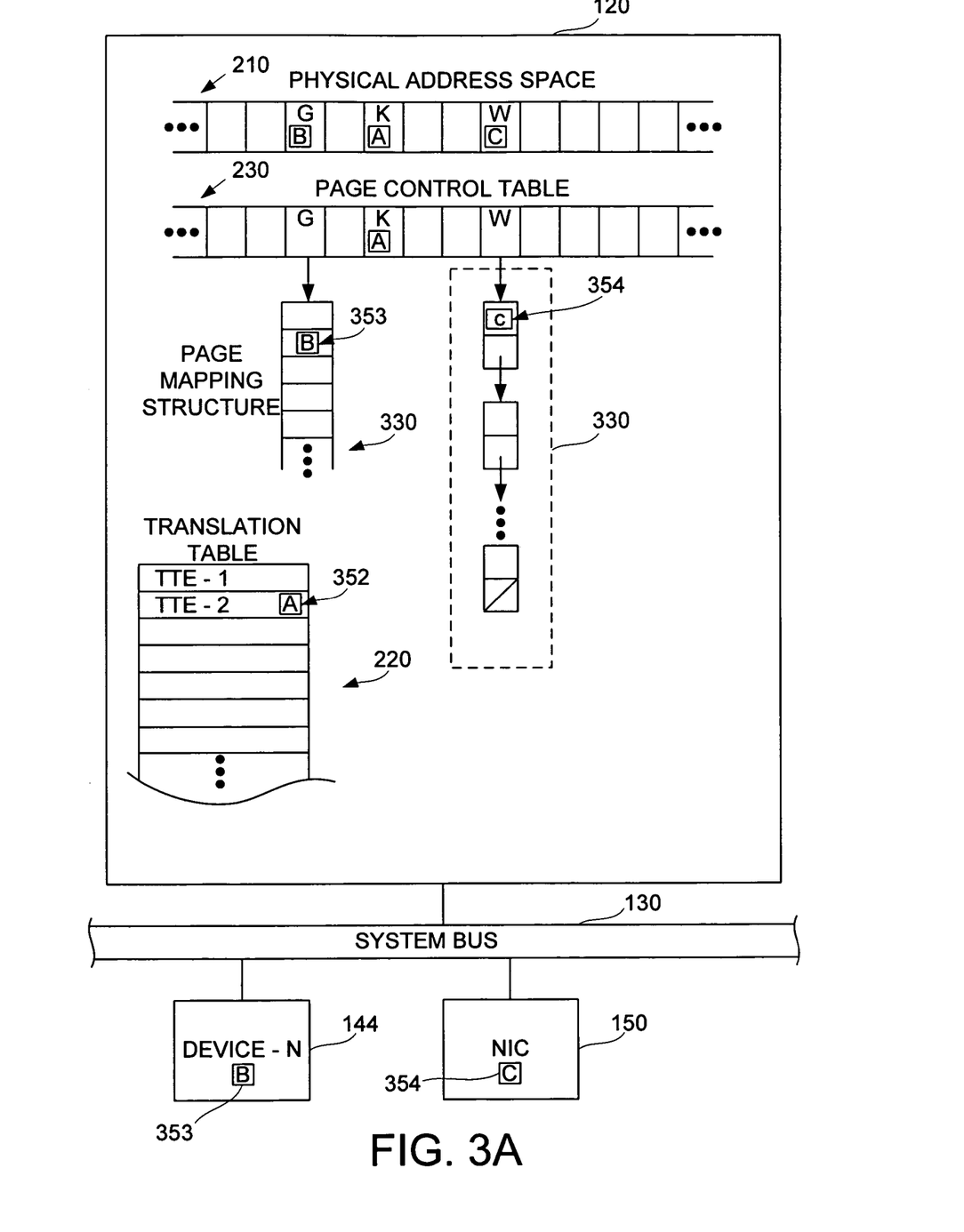
FIG. 3A is a diagram illustrating another physical address mapping framework, in accordance with another embodiment of the invention.

FIG. 3A is a diagram illustrating another physical address mapping framework, in accordance with another embodiment of the invention. For example, a data-B 353 from the device-N 144 and a data-C 354 from the NIC 150 can be communicated to the memory 120 via DMA on the system bus 130 for storage in the physical address space 210. Further, the CPU 110 (FIG. 1) can request storage of a data-A 352 in the physical address space 210. When the CPU 110 requests access to the memory 120, a page in virtual memory is assigned to store the data-A 352. The page is accessible from TTE-2 in the translation table 220, which is also registered in the page control table 230 at address-K. Correspondingly, the data-B 353 and the data-C 354 are registered in the page control table 230. Specifically, the data-B 353 and the data-C 354 can be stored in a page mapping structure 330.

In one exemplary embodiment of the page mapping structure 330, the data-B 353 can be stored in a statically-allocated structure such as an array. Each request for access to the memory 120 first registers in records within the page mapping structure 330 before accessing the physical address space 210. Alternatively, in another embodiment, the data-C 354 can be stored in nodes in a dynamically-allocated structure such as a linked list. Alternatively, a doubly linked list can replace the linked list. Of course, any structure is possible, as long as requests for access to the memory 120 can be registered in a physical address mapping framework.

The page control table 230 can use one page mapping structure such as an array or combine structures such as an array and an linked list, as shown in FIG. 3A. However, any combination of structures is suitable for registering requests for access to the memory 120. After registration, data from the CPU 110, the device-N 144, and the NIC 150 can be stored in the physical address space 210. For example, the data-A 352 can be stored in address-K in the physical address space 210.

Figure 3B:
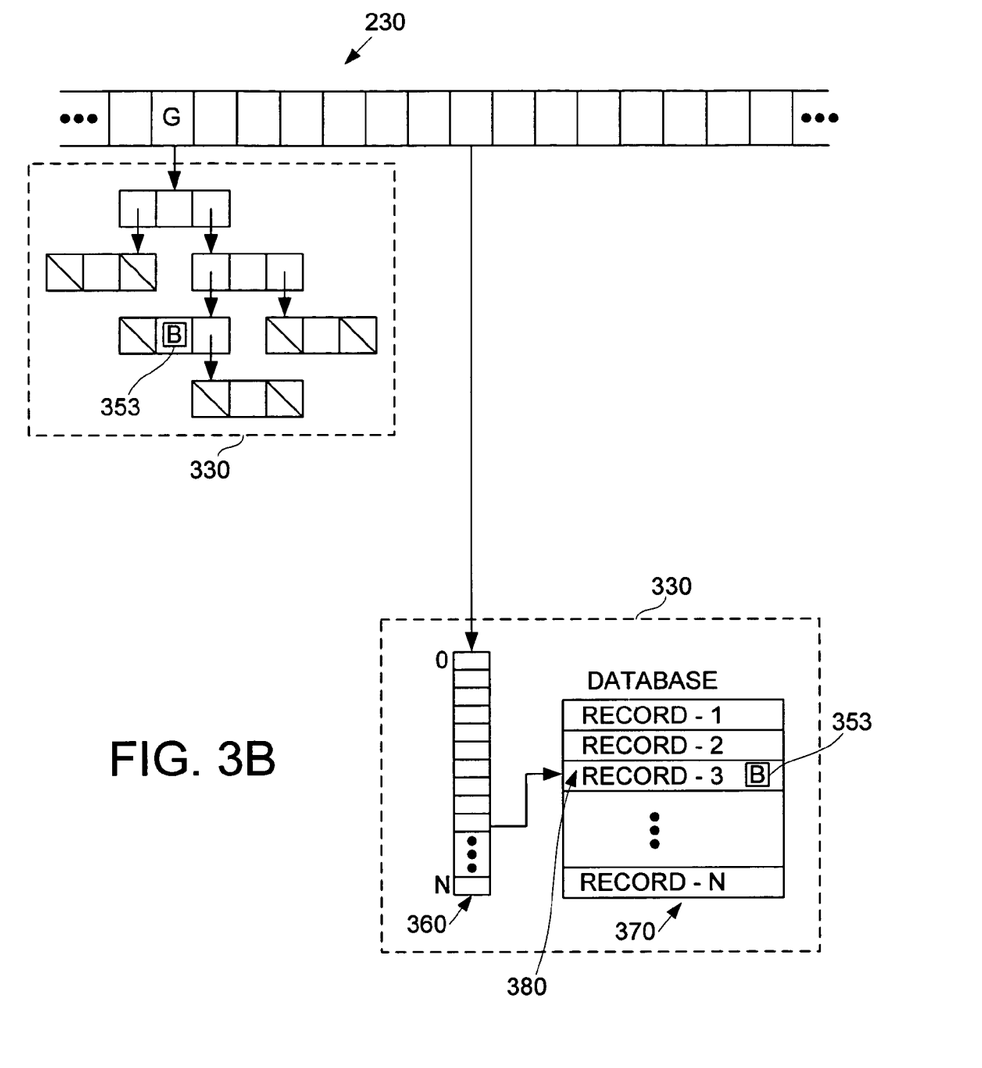
FIG. 3B is a diagram illustrating yet another physical address mapping framework, in accordance with yet another embodiment of the invention.

FIG. 3B is a diagram illustrating yet another physical address mapping framework, in accordance with yet another embodiment of the invention. In an alternative embodiment of the page control table 230, the page mapping structure 330 can be a tree coupled to address-G. Another embodiment of the page mapping structure 330 can be a database including an index 360 referencing multiple database records 380 in a table 370. Similar to the embodiments of the page mapping structures 330 illustrated in FIG. 3A, the tree and the database are exemplary structures that are capable of registering access to the memory 120. Accordingly, any structure is possible, as long as the structure registers the first access to the physical address space 210 from a device.

Figure 4:
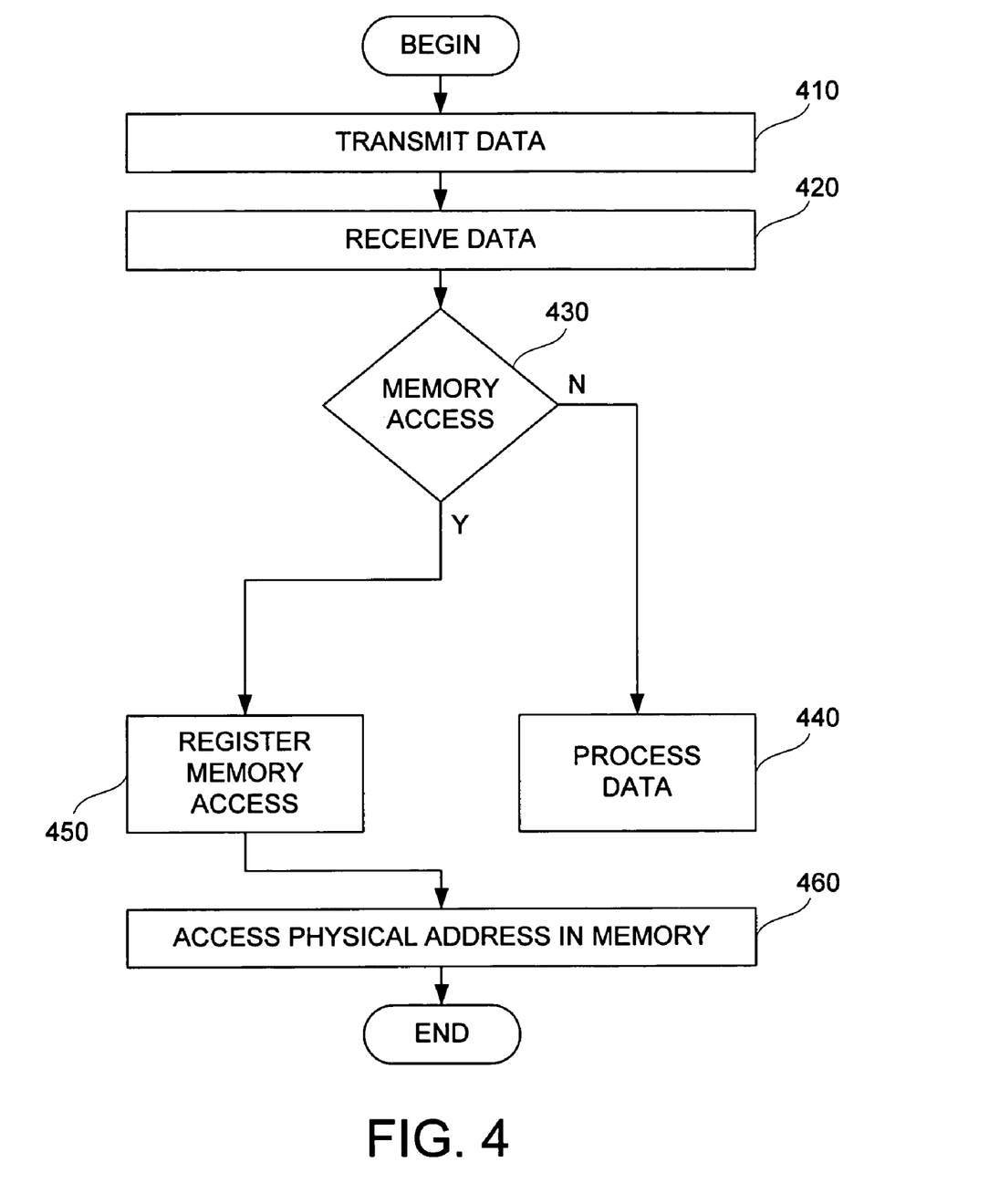
FIG. 4 is a diagram of a method for registering memory accesses, in accordance with an embodiment of the invention.

FIG. 4 is a diagram of a method for registering memory accesses, in accordance with an embodiment of the invention. Exemplary instructions for operations that register memory accesses from a device can begin in operation 410. Initially, a device such as the NIC 150 (FIG. 1) may transmit data via the system bus 130. Upon receiving the data in operation 420, the system determines whether the data requires memory access in a subsequent operation 430. If the NIC 150 does not require memory access, then in operation 440, the system processes the data. For example, the system may transmit the data to the CPU 110 for calculation. Alternatively, in operation 450, if the NIC 150 requires memory access, then the NIC 150 registers the memory access in operation 450. In one embodiment, the registration can occur in a page mapping structure 330 (FIG. 3) coupled to page control table 230. Thereafter, in operation 460, the NIC 150 can access the physical address in the memory 120 and end the method. In one embodiment, the NIC 150 can use DMA to access the memory 120. Alternatives embodiments permit devices, such as the NIC 150 to access the memory 120 via any mechanism as long as the initial request to access the memory 120 is registered in the page mapping structure 330.

Figure 5A:
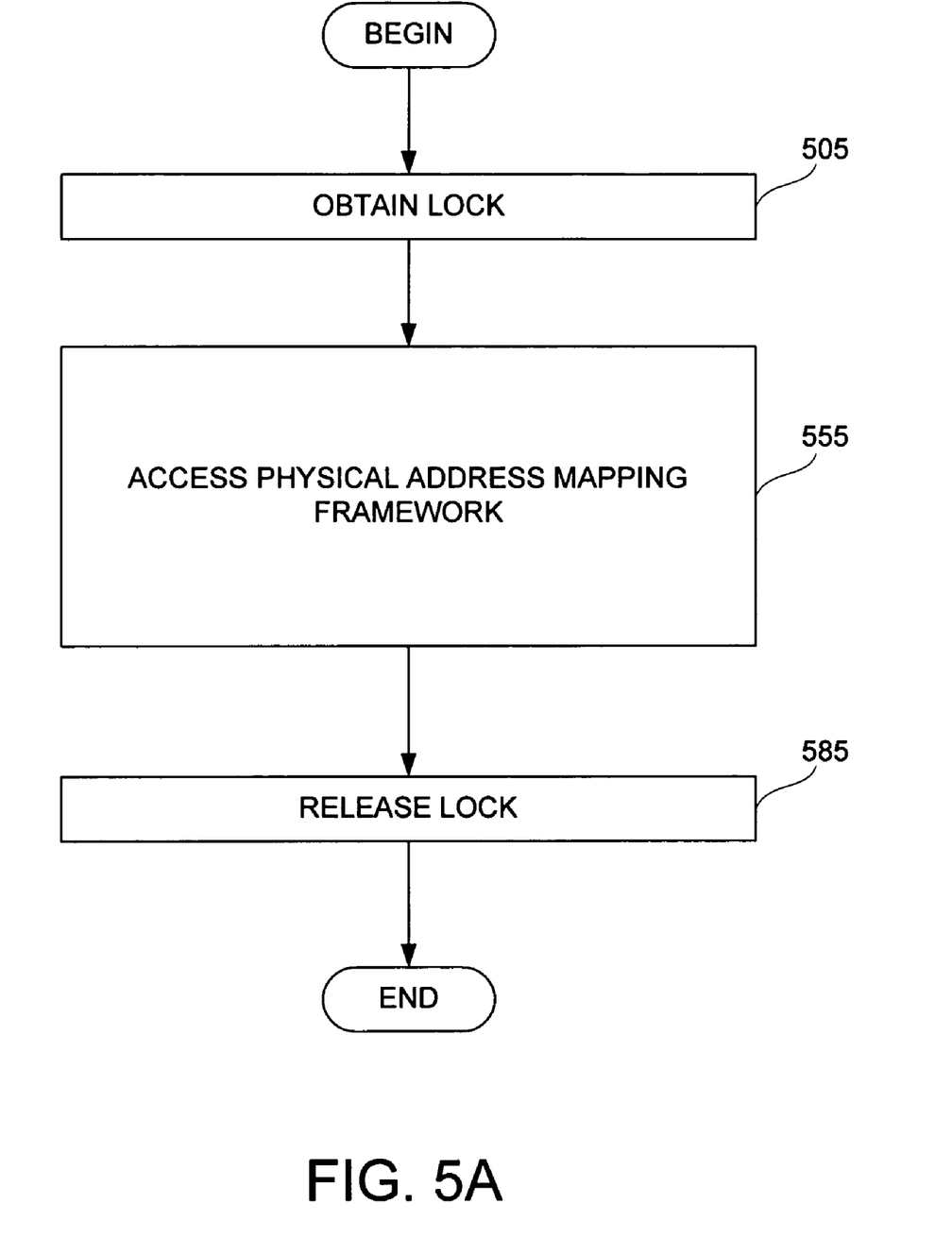
FIG. 5A is a diagram of a method for accessing a physical address mapping framework, in accordance with an embodiment of the invention.

FIG. 5A is a diagram of a method for accessing a physical address mapping framework, in accordance with an embodiment of the invention. Specifically, in one embodiment, the OS can begin any action to restrict access to the memory 120 by obtaining a lock in operation 505. For example, the lock can be a restriction on accesses to the page mapping structure 330. Then, in operation 555, the OS can access the physical address mapping framework via the restricted page mapping structure 330. Subsequently, in operation 585, the OS can release the lock by enabling access to the page mapping structure 330 and end the method.

Figure 5B:
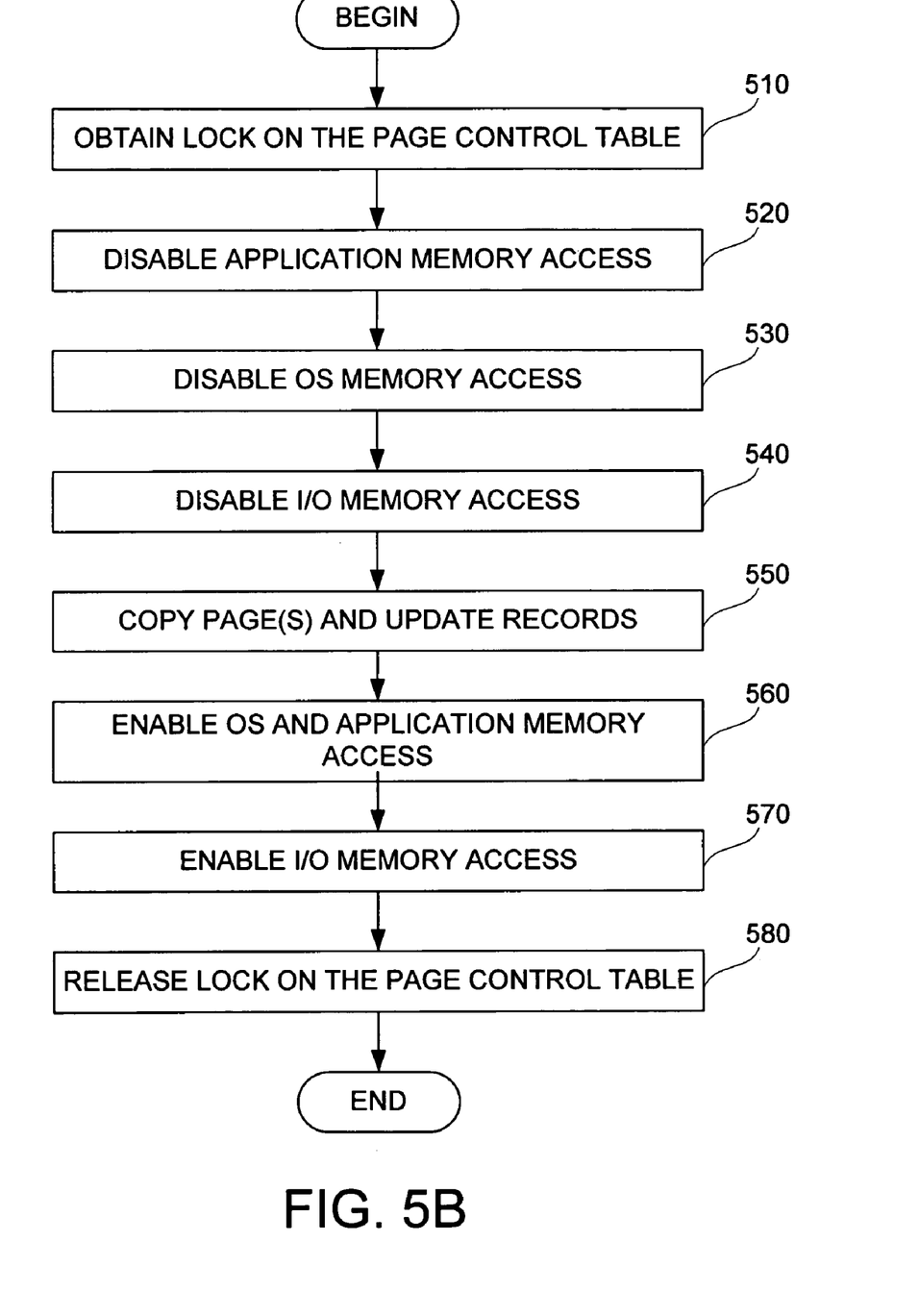
FIG. 5B is a diagram of another method for accessing a physical address mapping framework, in accordance with another embodiment of the invention.

FIG. 5B is a diagram of another method for accessing a physical address mapping framework, in accordance with another embodiment of the invention. Alternatively, another method begins when the OS obtains a lock on the page control table 230 in operation 510. After obtaining the lock, the OS can disable application memory access in operation 520 by preventing all applications from accessing pages involved in an exemplary data relocation. Then, in operation 530, the OS memory access is also disabled. Consequently, in operation 540, I/O memory access is disabled. In one embodiment, a pre-relocation method is information in the page mapping structure 330 that can signal to a registered device to halt access to the physical address space 210.

Thereafter, in operation 550, pages are copied or moved for data relocation. Further, records in the translation table 220 and the page control table 230 are updated. In operation 560, OS and application memory accesses are enabled. Then, I/O memory accesses are enabled in operation 570. In one embodiment, information, such as a post-relocation method can be used to signal to the registered device to resume accessing the physical address space 210.

Finally, the OS releases the lock on the page control table 330 to permit access to the pages involved in the data relocation in operation 580 and the method ends. During the copy of pages in the method illustrated in FIG. 5B, the OS is not placed in a coma-like state. Thus, during the data relocation of some of the pages in the physical address space 210, other processes in the system continue without affecting overall system performance.

Other exemplary embodiments are possible for relocating pages in the memory 120 as long as the memory uses a physical address mapping framework to record accesses to pages in the physical address space 210. Further, any method to enable and disable access from a device to the memory 120 is possible as long as the device registers in a physical address mapping framework before the first access to the memory 120.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for copying data from a first physical page in a memory that is directly accessible to input/output devices to a second physical page in the memory, the method comprising:
   requiring that each input/output device first register an access to the memory by a physical address of the memory prior to the access of the memory, the input/output devices registering the access by recording a source of data in the memory being accessed and the physical address of each physical page of the memory being accessed, the recording being made in a page mapping structure;
   obtaining a lock on a page mapping structure corresponding to the first physical page thereby preventing new accesses to the first physical page by one of the input/output devices;
   disabling access by registered devices to the memory by signaling the registered devices to halt access to physical address space, the registered devices being devices that have registered for access to the first physical page using the page mapping structure;
   copying the data from the first physical page to the second physical page; and
   enabling access to the second physical page in the memory by signaling the registered input/output devices to resume accessing the physical address space and by releasing the lock on the page mapping structure.

2. The method of claim 1, further comprising disabling application memory access prior to the copying.

3. The method of claim 1, wherein the copying of the page includes updating a record in the page mapping structure.

4. The method of claim 1, wherein the signaling of the registered devices to halt access includes accessing a pre-relocation method and the signaling of the registered devices to resume accessing the physical address space includes accessing a post-relocation method.

5. The method of claim 1, wherein the input/output devices access the memory via direct memory access.

6. A computer readable medium storing program instructions for copying data from a first physical page in a memory that is directly accessible to input/output devices to a second physical page in the memory, the program instructions comprising:
   program instructions for each input/output device causing the input/output device to first register an access to the memory by a physical address of the memory prior to the access of the memory, the input/output devices registering the access by recording a source of data in the memory being accessed and the physical address of each physical page of the memory being accessed, the recording being made in a page mapping structure;
   program instructions for obtaining a lock on a page mapping structure corresponding to the first physical page thereby preventing new accesses to the first physical page by one of the input/output devices;
   program instructions for disabling access by registered devices to the memory by signaling the registered devices to halt access to physical address space, the registered devices being devices that have registered for access to the first physical page using the page mapping structure;
   program instructions for copying the data from the first physical page to the second physical page; and
   program instructions for enabling access to the second physical page in the memory, by signaling the registered input/output devices to resume accessing the physical address space and by releasing the lock on the page mapping structure.

7. The computer readable medium of claim 6, further storing program instructions for disabling application memory access prior to the copying.

8. The computer readable medium of claim 6, wherein the copying of the page includes updating a record in the page mapping structure.

9. The computer readable medium of claim 6, wherein the signaling of the registered devices to halt access includes accessing a pre-relocation method and the signaling of the registered devices to resume accessing the physical address space includes accessing a post-relocation method.

10. The computer readable medium of claim 6, wherein the input/output devices access the memory via direct memory access.

* * * * *